Figure 1:
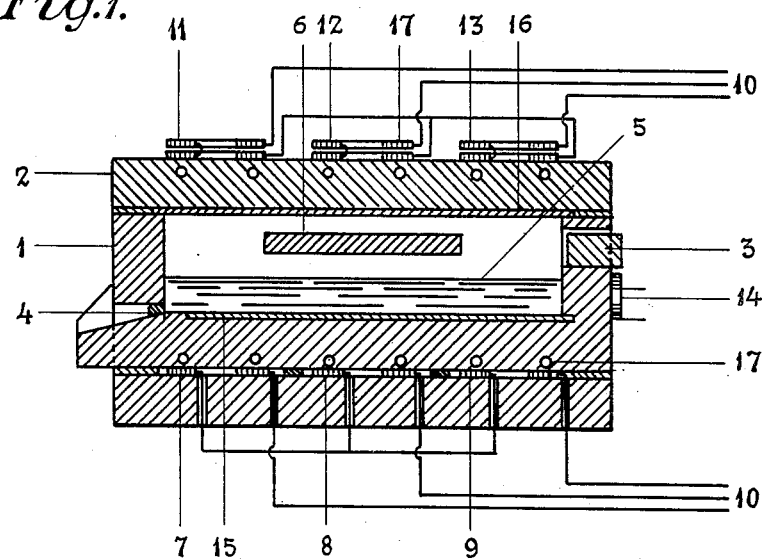
Figure 2:
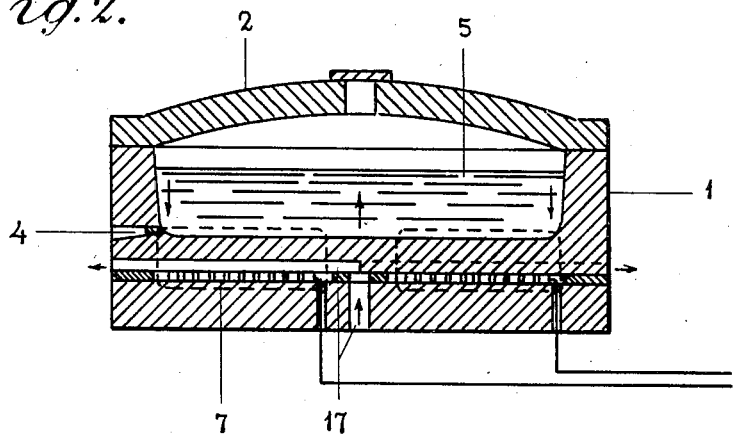

April 5, 1932.  I. RENNERFELT  1,851,984

ELECTRIC FURNACE

Original Filed June 21, 1927

Witnesses:
Nils Ericsson
J. Hårdén

Inventor:
Ivar Rennerfelt

Patented Apr. 5, 1932

1,851,984

UNITED STATES PATENT OFFICE

IVAR RENNERFELT, OF DJURSHOLM, SWEDEN

ELECTRIC FURNACE

Application filed June 21, 1927, Serial No. 200,465, and in Sweden July 3, 1926. Renewed December 31, 1931.

My invention relates to electric furnaces of the induction types and particularly to such furnaces operating with high frequency currents and it has for its objects: first, to provide a furnace capable of heating in an efficient manner metallic or non-metallic substances; second, to provide a practical and reliable furnace for heating on a commercial basis large charges of several tons of liquid steel or other metals or alloys of metals; third, to provide a furnace well adapted to be operated by means of polyphase currents; fourth, to provide means for heating a closed furnace room both from below and from above; fifth, to provide a furnace especially adapted for heating flat objects; sixth, to provide a furnace adapted for heating and vigorously stirring a shallow bath of a liquid substance, obviating entirely the use of a deep cylindrical crucible with all its inherent limitations and difficulties when heating a charge of large volume; and seventh, to provide a high frequency furnace, in which heat is generated principally in the lowest layers of the charge and vertically transmitted by convection and conduction to the upper parts.

I attain the several objects enumerated above by providing a furnace having one or several spirally wound flat "pancake" coils suitably connected to each other and to a source of high frequency currents together with special means for raising the power factor of the circuit, such as a synchronous machine, a battery of condensers or any other apparatus capable of delivering wattless-currents to the furnace. The flat inductive pancake coil consists of a plurality of turns of gradually increasing diameters, preferably of copper tubing so as to permit circulation of water or any other cooling medium. The coil is located underneath the surface of the refractory hearth, in which heat is to be generated by currents induced either directly in the charge or in a special heating body, from which the heat may be transmitted to the objects in the furnace, which it is desired to heat. Flat coils may be placed also on top of the furnace and even along the outside vertical surfaces, in which latter case the coil may be slightly curved so as to follow closely the shape of the furnace wall.

The coils may be round, rectangular, very elongated or shaped in any other manner as demanded by the construction of the furnace or the nature of the work to be performed in each particular case. When employing ordinary three phase power a furnace may be provided with three, six or even more coils located at a suitable distance from each other underneath the bottom of the furnace but one may use also two or a multiple of two coils if employing the well known Scott method of transforming three phase currents into two phase currents. This latter method is especially suitable for the bottom and top of a hardening furnace, phase-coils being placed both underneath and above.

The coils are to be electrically well insulated from each other and from the charge, employing refractory materials of a sufficient thickness. Channels or ducts may be provided in the refractory materials close to the coils in order to afford means for cooling by compressed air or otherwise. The coils may consist of two individual units placed close to each other and concentrically in order to increase the inductive power, if this is considered necessary.

The accompanying drawings show in Fig. I a section of a special type of a high frequency furnace provided with a system of pancake coils according to my invention. In Fig. II a section of a refining furnace is shown, provided with only one flat pancake coil located underneath the surface of the hearth and embedded in the foundation of the furnace. The furnace in Fig. I consists of a refractory lower part 1 covered by a removable roof 2. An opening 3 is provided in the side wall and a taphole and spout 4 permits pouring a liquid charge 5. An object to be heated is indicated by 6. This may be introduced through the opening 3 or by lifting the roof. For generating the heat a system of round, rectangular or elongated flat coils 7, 8, 9 is located underneath the furnace and connected to the three phase mains 10. Another system of similar coils 11, 12, 13, is provided on top of the roof, each coil consisting of two units close to each other. On the side wall of the furnace another coil 14 is located, showing how heat may be generated within the furnace by means of flat coils, shaped so as to follow the curvature of the furnace wall.

If the physical properties of the charge 5 do not permit using it as a heating body special heating bodies 15 and 16 may be provided, consisting of nickel chromium alloys, carbon, carborundum or any other suitable material. If for instance the charge consists of silver, said heating bodies may conveniently be made of wrought iron. For cooling the refractory body ducts 17 may be provided for circulating water or better cold air as indicated.

The furnace in Fig. II consists of a lower part 1, a removable roof 2 and a flat pancake coil 7. A taphole 4 permits pouring the liquid charge 5 and another hole in the centre of the roof may be used for introducing a charge or additions or for inspection purposes. The flat coil sets up a flux of magnetic lines of force, indicated by dotted lines encircling the coil in radial directions. Said lines of force are more concentrated towards the central edge of the coil and, thus, they cause a more intense heating of the charge in a ringshaped zone around the centre. Due to the higher temperature in the central parts an upward movement will take place in the charge causing simultaneously a downward movement in the parts near the side wall, where the temperature is somewhat lower. Other circulating movements will be caused by inductive forces, set up by the lines of forces. It is, thus, clear, that a bath of a metal, heated in this way, will be gently but at the same time efficiently stirred and that the chemical reactions which may be desirable, are going to be considerably facilitated.

I do not want to limit myself to any certain frequency nor to any definite number of coils or phases. I claim also broadly the use of flat "pancake" coils in any kind of induction furnace with high or low frequency, regardless of the general construction or the purpose, for which they are intended, whenever such coils are arranged in conformity with this description and the accompanying drawings. Practical experiments prove that metals may be easily melted in shallow crucibles if placed on top of a high frequency pancake coil. Similarly, a piece of sheet iron of any shape, if placed on top of such a flat coil, is rapidly heated to a white heat and may be caused to melt.

Having now fully described my invention, I claim and desire to secure by Letters Patent of the United States:

1. In combination, an electric furnace having a substantially flat shallow interior, a flat internally cooled inductive coil formed of tubing of non-ferrous metal, mounted in the bottom of said furnace, a similar coil arranged above the charge, and flat conductive bodies arranged internally of the furnace in close relation to said coils, said conductive bodies being heated by eddy currents produced by high frequency magnetic fields induced by suitable currents supplied by a source of alternating power, to which the said coils are connected, the said high frequency fields being interlinked with the said flat bodies.

2. In combination, an electric furnace having a substantially flat shallow interior, a flat internally cooled inductive coil formed of tubing of non-ferrous metal, embedded in the body of said furnace, a similar coil mounted above the charge, inductive coils arranged exteriorly about the lateral walls of the furnace, and flat conductive bodies arranged internally of the furnace in close relation to the said top and bottom coils, the said conductive bodies being heated by currents produced by high frequency magnetic fields induced by suitable current supplied by a source of alternating power, to which the said tube and body are connected, the said high frequency fields being interlinked with the said flat bodies.

3. The method of heating and refining a substance of the group comprising metals, which consists in providing a shallow, refractory container, embedding in its bottom at least one flat, ironless, internally cooled induction coil, introducing a substance to be treated into the container and admitting phase compensated alternating current of sufficient frequency to at least one of the flat coils so as to cause heat to be generated by induction in the substance, at the same time causing the substance to be vigorously agitated.

4. The method of heating and refining a substance of the group comprising steel, which consists in providing a shallow refractory container, embedding in its bottom a system of at least two flat, ironless, internally cooled induction coils, introducing the substance to be heated in said container and admitting phase compensated polyphase current to the coils for the purpose of heating and stirring the metal by the cooperative action of individual magnetic fields from each coil thus causing the heat to be rapidly transported upwards by conduction and convection currents.

5. The method of heating and refining a substance of the group comprising metals, which consists in providing a refractory container, embedding flat, ironless, internally cooled coils in its bottom and slightly curved similar coils in the wall, and admitting to the coils, alternating phase compensated high frequency currents.

Signed at Stockholm in the county of Stockholms Län and State of Sweden this 9th day of June, A. D. 1927.

IVAR RENNERFELT.